United States Patent Office 3,203,338
Patented Aug. 31, 1965

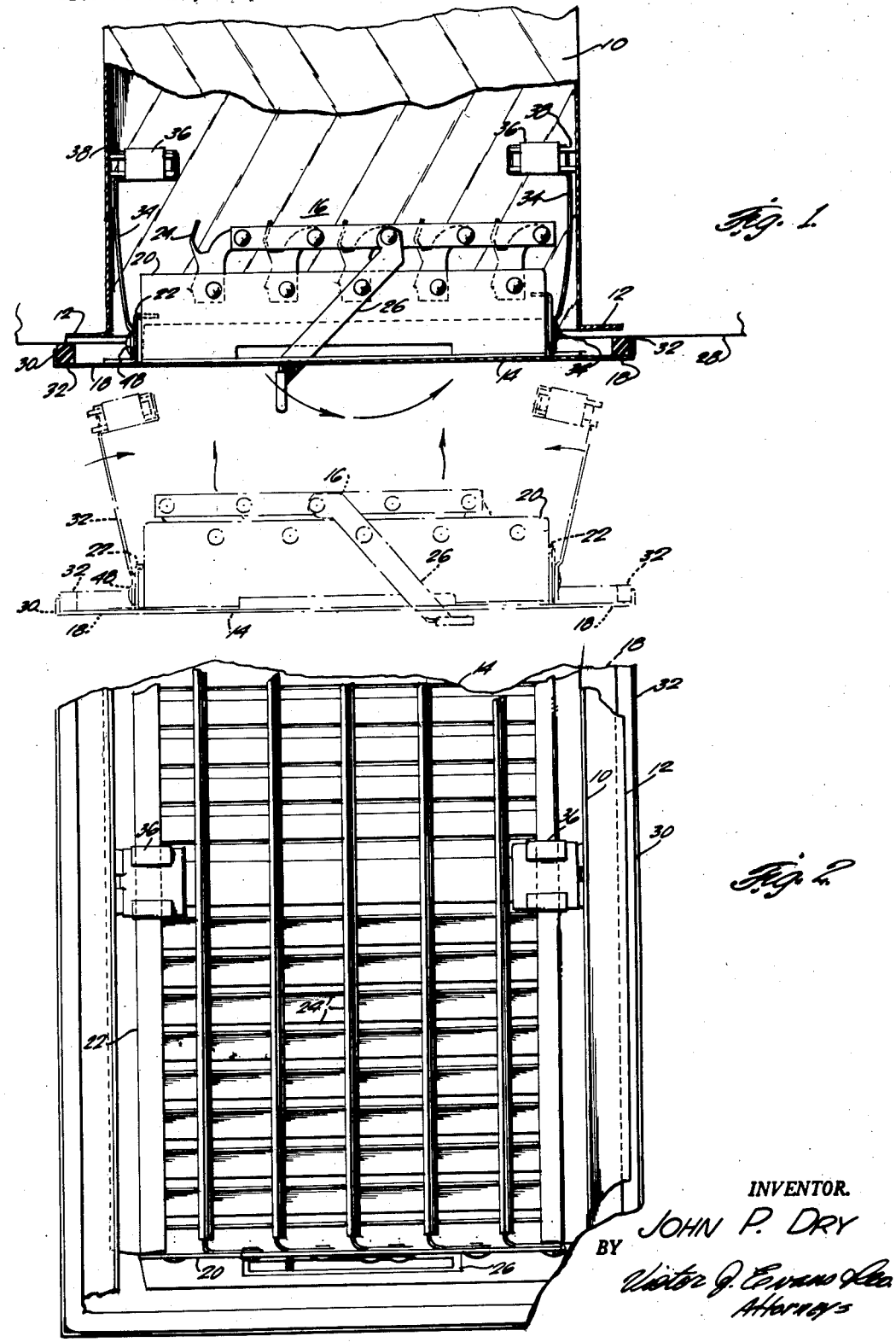

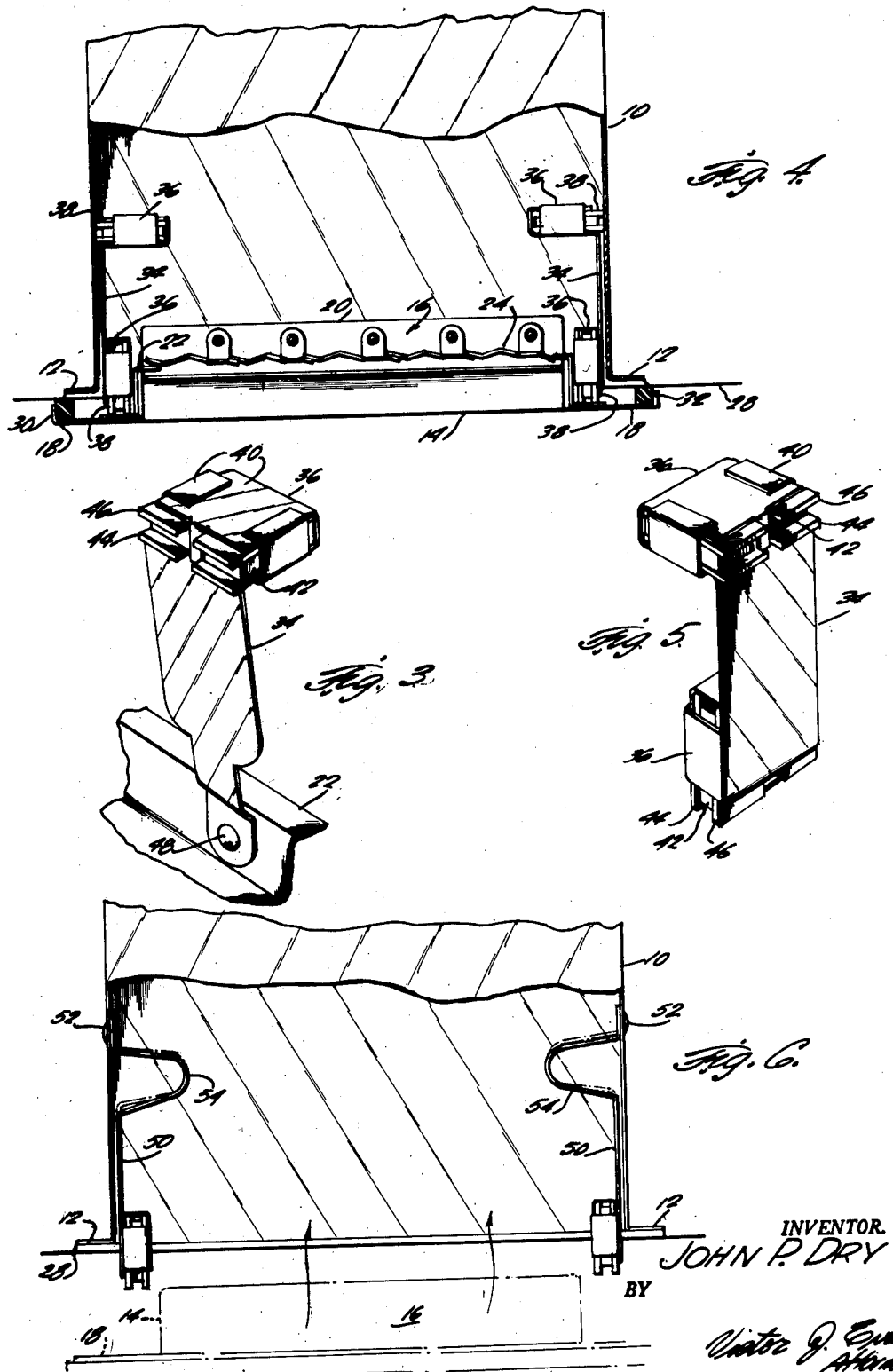

3,203,338
MAGNETIC VENTILATOR SUPPORT
John P. Dry, Box 427, Winters, Tex.
Filed Dec. 27, 1963, Ser. No. 333,910
6 Claims. (Cl. 98—114)

This invention relates generally to grill, registers, and diffusers employed in an air circulating conduit and more particularly to a mounting support for such items in an open end of a duct.

Heretofore, grills, registers, etc. have been mounted in the opened end of a duct defined by flanges thereon by means of threaded fasteners of one type or another. For instance, matching holes are provided, one in the grill and a smaller one in the flanges of the duct. Sheet metal screws are then inserted through the matching holes for threaded engagement with the duct. Such fastening means, however, are inherently unreliable, since stripping of the smaller hole in the duct destroys the threaded engagement of the screw. It is commonly known that, such stripping of sheet metal threads may result after several removals and insertions of the screws or upon increased turning beyond its intended ultimate limit.

Another type of fastening includes a bolt permanently secured to the flange of the duct. In such structures, the grill includes a matching hole for the bolt and an ornamental nut is threadably engaged thereon for holding the grill. However, because of the construction practices presently employed, these mounting structures, as well as the sheet metal screw structures, are often made inadequate. For instance, the flanges of the duct which engage the flat surface of the wall, floor, or similar structure are sometimes covered by workmen during application of plaster, tile, and other covering materials. In such instances the sheet metal screws and bolts may not be sufficiently long to pass through the covering material to allow engagement with the duct or ornamental nut.

Also, during installation of the ducts in particular, damage may result to the flange portion resulting in complete destruction of the fastening structures. This damage and destruction can only be corrected by complete replacement of the duct, resulting in added costs to the builder.

Furthermore, if the duct is installed incorrectly, the grill will assume the same incorrect mounting. That is, if the duct is not installed on a level, the grill will also be askew, since the mounting holes must align with one another.

In both of the aforementioned fastening structures the external appearance of the grill is impaired by the use of screws and nuts regardless of their ornamental configurations. Furthermore, when it is desired to remove the grill for various purposes, as for cleaning a filter therein or retrieve an article lost therein, it is necessary to employ a screw driver or a wrench. In addition, it is common for such fastening devices to become lost at one time or another, such as during removal of the grill for any reason.

As is well known in the sheet metal industry, it is difficult to provide a duct with recessed portions for allowing the use of other fastening structures. That is, the common duct is formed by a piece of sheet metal cut at the ends to provide flanges and bent to conform to a suitable cross section, such as for instance, rectangular. Such configurations of recessed portions, tab elements, or mounting blocks increases costs considerably over that of the usual duct structures. For these reasons, it is undesirable to employ other well known types of fastening structures for grills and the like.

It is apparent, therefore, that the well known fastening structures are inadequate for mounting of grills, registers, diffusers and the like in air circulating conduits. The need, therefore, exists and is desired for a new mounting support for grills, registers, and the like which obviates the aforementioned disadvantages of prior structures.

It is a primary object of this invention, therefore, to provide a mounting support for grills, registers, and the like which does not require screws and bolts.

It is another object of this invention to provide a mounting support for grills, registers, and the like which does not require exact setting of the duct opening in relation to the flat surface it is mounted on.

Still another object of the present invention is to provide a mounting support for grills, registers, and the like, which does not require the use of particular and special configurations of the ducts for more positive mounting.

Yet another object of the present invention is to provide a mounting support for grills, registers, and the like which can be quickly and easily removed for purposes of cleaning, etc. as desired.

These and other objects of the present invention will be more fully realized from the novel structure thereof which includes generally, a resilient arm disposed between the grill and the duct and means for engaging one end of the arm to the grill and the other end thereof to the duct. The means includes at least one magnet secured to the arm.

The invention, however, will be more fully realized and understood from the following detailed description when taken in conjunction with the accompaning drawings wherein:

FIGURE 1 is a side elevational view of one embodiment of the invention showing in partial section the duct and in phantom lines the position of the grill prior to insertion into the duct;

FIGURE 2 is a partial rear view of the invention as shown from the inside of the duct;

FIGURE 3 is an enlarged detail view in perspective of the invention shown in the embodiment of FIGURES 1 and 2;

FIGURE 4 is a side elevational view of another embodiment of the invention also illustrated in partial section through the duct;

FIGURE 5 is an enlarged detailed view shown in perspective of the mounting support of the embodiment shown in FIGURE 4; and FIGURE 6 is a side elevational view in partial section of still another embodiment of the invention showing the grill in phantom lines.

Like reference numerals throughout the various views of the drawings are intended to designate the same or similar structures.

With reference to the drawings in detail, a duct 10 includes flanges 12 defining an opening in an air circulating conduit. A grill 14 includes a louver portion 16 and flange portions 18. The louver portion is supported between a pair of members 20 and another pair of members 22 secured to the flanges. A plurality of louvers 24 are disposed in the louver portion. Some of the louvers are secured between members 22 and the remaining louvers are pivotally connected between members 20 for allowing adjustability in air flow therethrough by means of adjusting mechanism 26 connected thereto. Flanges 12 of the duct are adapted for engaging a flat surface 28 of a wall or similar structure. Flanges 18 of the grill are likewise adapted for engaging the flat surface and for covering the flanges of the duct. Flanges 18 include upturned portions 30 for partially housing a sealing member 32 therein, such as a strip of foam rubber. This structure allows the grill to be positioned on the flat surface without marring the appearance thereof and allows some freedom of movement thereon by the resilient engagement offered by member 30.

The grill mounting structure of the present invention illustrated by the embodiment of FIGURE 1 includes a pair of resilient arms 34 each secured to a respective one of members 22. The other end of each one of arms 34 is fashioned or constructed in the shape of a housing 36 for supporting a magnet assembly 38 therein. Each magnet assembly is adapted for engaging a respective side wall of duct 10, said wall being constructed of a magnet responsive material.

The grill assembly illustrated by the phantom lines in FIGURE 1 shows the position of the elements of the present invention prior to their insertion into duct 10.

The adjustable louvers are shown therein in closed position and it can be seen that interference does not result between the louver adjusting mechanism and the mounting structures of the invention. Resilient arms 34 are biased to maintain a force on the magnets in a direction toward the side walls of duct 10.

That is, arms 34 have their free or unattached ends supporting the magnet assemblies spaced at a greater distance than the width of the duct.

When it is desired to insert the grill into the duct for positioning and mounting, the magnet assemblies and resilient arms are pushed toward one another until their relative displacement is less than the opening defined by flanges 12. Magnetic engagament is then provided between the grill and the side walls adjacent the flanges of the duct. The grill is then pushed into the opening and magnet assemblies 38 slide along the side walls until flanges 18 engage with flat surface 28. During the installation operation of the grill, it can be seen that sufficient clearance is allowed for one's fingers to hold arms 34 inwardly until the magnet assemblies pass into the opening of duct 10. Also, sufficient clearance is provided for the adjustment of the louver portion, since arms 34 are disposed in adjacent relationship to the side walls of the duct.

As shown in FIGURE 2, the magnet assemblies do not impede any of the air flow through the circulating conduit by virtue of their small cross-sectional area. In the exemplifications shown and described herein, two magnet assemblies are illustrated each having their larger cross section exposed to the fluid path. However, it is to be understood that any number of magnet assemblies can be employed as desired. Also, the magnet assemblies could be positioned orthogonally to the positions illustrated so that a small cross section thereof is exposed to the fluid path.

FIGURE 3 illustrates in enlarged detail and perspective view the mounting support of the exemplification shown in FIGURES 1 and 2. Housing 36 is preferably formed by tabs or extensions 40 of arm 34. The magnet assembly preferably includes a permanent magnet 42 and a pair of pole plates 44 and 46 disposed adjacent a respective pole of the magnet. Each pole plate includes a slot for receiving an extension or tab therein for retaining the magnet assembly within the housing. Arm 34 is connected at the other end thereof to member 22 by a rivet 48 or similar fastening means.

The embodiment shown in FIGURE 4 provides for a mounting support requiring no permanent fastening structures with the grill or the duct. That is, the mounting support is a separate structure not requiring fastening to either the grill or the duct. This structure, as shown more clearly in the enlarged detail view of FIGURE 5, includes resilient arm 34 having a pair of magnet assemblies 38 each disposed at respective ends thereof. The magnet assemblies are disposed in orthogonal relationship to one another and are secured to the respective ends of arm 34 by the tab structures shown in the embodiment of FIGURE 3. One of the magnet assemblies is disposed for engaging flange 18 of the grill. As shown in FIGURE 4, sufficient space is allowed between members 22 and the side walls of duct 10 to allow the one magnet assembly to be inserted therein.

The structure of this embodiment provides a mounting support for those grills and registers in which their original mounting structures have been destroyed or otherwise made inadequate.

The embodiment of FIGURE 6 includes fastening of an arm 50 to the side wall of duct 10 by means of a rivet 52. A loop 54 is provided in the arm for allowing resilient action along the side of the duct. The magnet assembly is secured to the free end of the arm and extends through the opening of duct 10. The magnets are disposed for engaging the inner surfaces of flanges 18 of the grill. As shown by the dotted lines at the loop portion, the magnets are disposed for relative movement toward the grill when a magnetic path is provided therebetween. That is, as grill 14 is brought into engamenet with surface 28, arm 50, by virtue of loop 54 therein, allows the magnets to be attracted toward the grill and to make a magnetic engagement therewith.

The principles of the invention explained in connection with the specific exemplifications thereon will suggest many other applications and modifications of the same. It is accordingly desired that, in construing the breadth of the appended claims they shall not be limited to the specific details shown and described in connection with the exemplifications thereof.

What is claimed is:

1. In an air circulating conduit including a duct having side walls constructed of magnet responsive material and said walls terminating in an opening and a grill for covering said opening, a mounting support for said grill comprising a resilient arm, means for engaging one end of said resilient arm to said grill and the other end thereof to said duct, said means including a pair of magnets each secured to a respective end of said arm for engaging said grill and said duct respectively for forming a magnetic circuit.

2. The mounting support of claim 1 wherein said means includes a pair of magnets each secured to a respective end of said arm for engaging said grill and said duct respectively for forming a magnetic circuit.

3. In an air circulating conduit including a duct having straight side walls constructed of magnet responsive material and said walls terminating in a plurality of flanges defining an opening each adapted for flush engagement with a flat surface and a grill for engaging substantially flush with the flat surface and for covering the opening, a mounting support for the grill comprising a resilient arm disposed between said grill and one side wall of said duct, means for engaging one end of said arm with said grill and the other end thereof to said duct, said means including a magnet secured to said arm.

4. In the air circulating conduit of claim 3, said grill including a louver portion and a flange portion for engaging the flat surface at the outer edges thereof and supporting the louver portion at the inner edges thereof, the mounting support therewith wherein said magnet is secured to the one end of said arm for engaging the flange portion of said grill adjacent the louver portion between the edges thereof and forming a magnetic circuit therewith.

5. The mounting support of claim 3 wherein said magnet is secured to the other end of said arm and disposed for sliding engagement with one side wall of said duct for forming a magnetic circuit.

6. In an air circulating conduit including a duct having straight sidewalls constructed of magnet responsive material and said walls terminating in a plurality of flanges defining an opening each adapted for flush engagement with a flat surface and a grill for engaging substantially flush with the flat surface and for covering the opening, the improvement residing in a mounting support for the grill in the duct comprising a resilient arm including a housing at each end thereof and a pair of magnet assemblies each disposed in a respective one of said housings, one of said assemblies disposed for engaging said grill and the other disposed for engaging a sidewall of said duct, said assemblies being disposed on said arm in orthogonal relationship to one another.

References Cited by the Examiner
UNITED STATES PATENTS

| | | | |
|---|---|---|---|
| 2,147,482 | 2/39 | Butler. | |
| 2,571,726 | 10/51 | Koch | 98—114 X |
| 2,722,170 | 11/55 | Broberg | 98—114 |
| 2,985,093 | 5/61 | Averill | 98—110 X |
| 3,145,477 | 8/64 | Morrison | 248—206 X |
| 3,149,268 | 9/64 | Hansen et al. | 248—206 X |

FOREIGN PATENTS 176,996  10/61  Sweden.

ROBERT A. O'LEARY, *Primary Examiner.*